C. R. BRYANT.
PISTON PACKING RING.
APPLICATION FILED MAY 25, 1915.
1,180,970.
Patented Apr. 25, 1916.
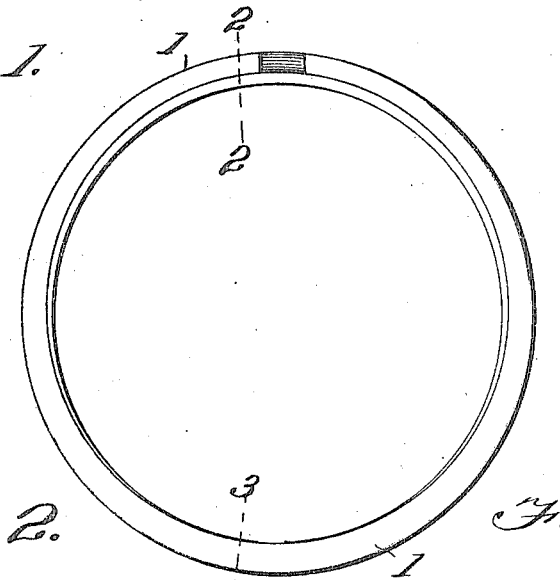
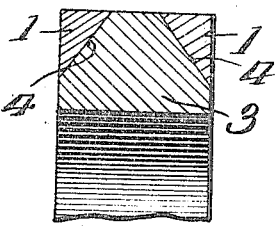
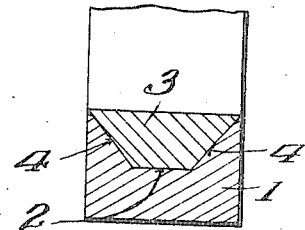
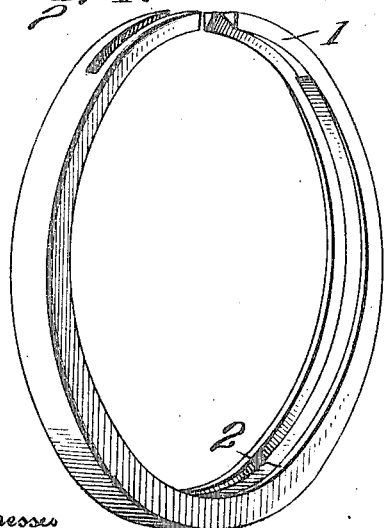
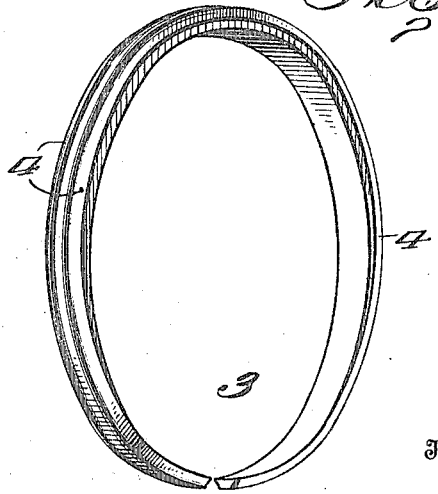
Witnesses
Floyd R. Cornwall.
Mildred P. Imirie.
Inventor
Clarance R. Bryant.
By
Attorney

UNITED STATES PATENT OFFICE.

CLARANCE R. BRYANT, OF MEMPHIS, TENNESSEE, ASSIGNOR, BY MESNE ASSIGNMENTS, TO CONTINENTAL PISTON RING COMPANY, OF MEMPHIS, TENNESSEE, A CORPORATION OF TENNESSEE.

PISTON PACKING-RING.

1,180,970. Specification of Letters Patent. Patented Apr. 25, 1916.

Application filed May 25, 1915. Serial No. 30,292.

*To all whom it may concern:*

Be it known that I, CLARANCE R. BRYANT, of Memphis, in the county of Shelby and State of Tennessee, have invented certain new and useful Improvements in Piston Packing-Rings; and I do hereby declare the following to be a full, clear, and exact description of the invention, such as will enable others skilled in the art to which it appertains to make and use the same.

The object of this invention is to provide an extremely simple and highly efficient packing ring which will prevent all danger of leakage of fluid, and the parts of which may readily and easily be united and detached.

In the accompanying drawings, Figure 1 is a side elevation. Fig. 2 is a section on line 2—2, Fig. 1. Fig. 3 is a section on line 3—3, Fig. 1. Fig. 4 is a view of the outer member, and Fig. 5 a view of the inner member.

Referring to the drawings, 1 designates an outer split member the wall of which is eccentric to the axis of such member, being of maximum width at a point directly opposite the ends of such member, and gradually decreasing in thickness toward such ends. In the inner surface of such outer member is formed a circumferential eccentric groove 2, the minimum depth of which is at a point opposite the split ends, the maximum depth being at or near such split ends.

I have shown the ends as being in themselves split or separated, but this is not essential, the purpose being merely to increase the yielding qualities of the outer member to permit insertion and removal of the inner member. The inner member 3 is also split, and is eccentric, the widest point being directly opposite the split ends, the eccentricity lessening toward such ends. In cross section, the wall of this inner split member is formed with a double beveled face, as at 4, such beveled face of the inner member conforming to the contour of the groove in the outer member, as shown in Figs. 2 and 3. Normally, the split ends of the inner member are diametrically opposite the split ends of the outer member, and when in this position a practically true circle is formed by the inner member, and the split ends of the two members being out of line with each other, no leakage can occur at these points, the walls of the outer member protecting the ends of the inner member while the body of the inner member extends over the space between the ends of the outer member. Furthermore, by reason of the perfect fit between the beveled faces of the inner member and the groove of the outer member, all danger of escape of fluid between the two parts is avoided.

The advantages of my invention will readily be appreciated by those skilled in the art. It will be seen that we have provided an extremely simple and highly efficient form of metallic packing which will effectively guard against leakage, and the parts of which may readily and easily be secured together.

I claim as my invention:

1. A packing ring comprising two split members, one having a continuous circumferential groove of greatest width at or near the split ends, and the other member formed to fit in said groove, such other member being of graduated thickness, the maximum thickness being at a point intermediate such ends.

2. A packing ring comprising an outer split member formed on its inner surface with a continuous eccentric groove, the greatest depth of such groove being at the split ends of such member, and an inner split member of eccentric formation having its greatest width at a point intermediate the ends of such member, the split ends of the two members being out of line with each other.

3. A packing ring comprising an outer split member of eccentric formation having an inner circumferential groove of greatest depth at the ends of such member, and an inner member of eccentric formation having a beveled surface for fitting in the groove of the outer member, the maximum point of thickness of such inner member being midway between the ends of the latter.

In testimony whereof, I have signed this specification in the presence of two subscribing witnesses.

CLARANCE R. BRYANT.

Witnesses:
MILDRED P. IMIRIE,
FRANCIS S. MAGUIRE.